J. F. BECKER.
ADJUSTABLE LIGHT SHIELD FOR AUTOMOBILES.
APPLICATION FILED APR. 4, 1913.
1,106,485.
Patented Aug. 11, 1914.
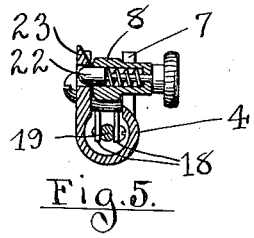
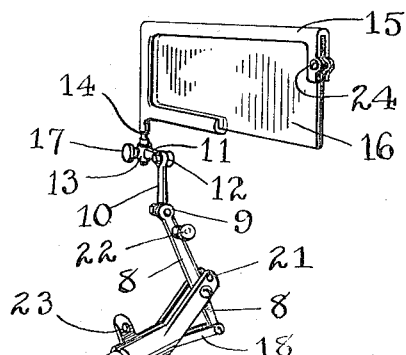
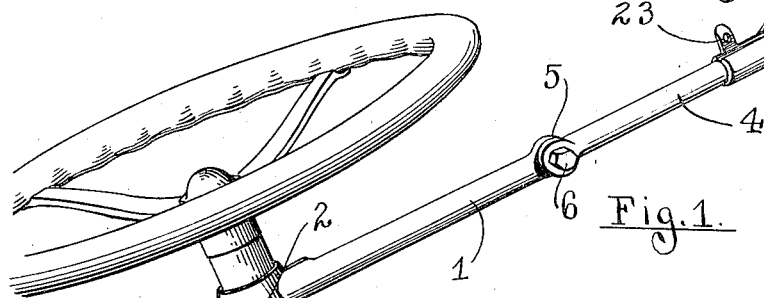
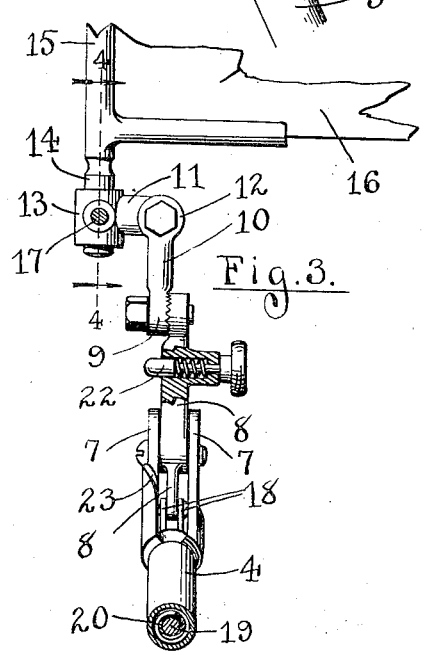
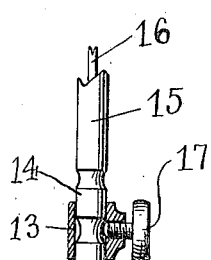
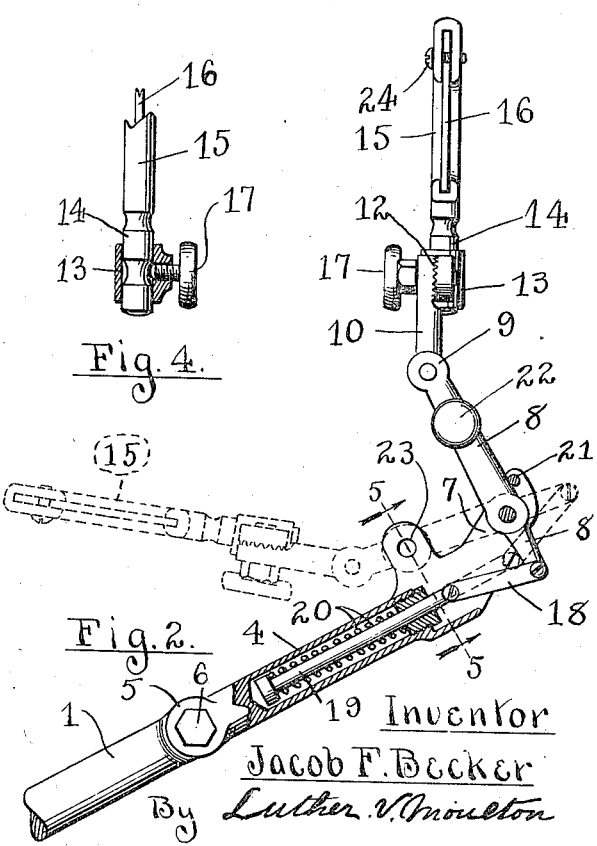
Witnesses
Harold O. Van Antwerp
Palmer A. Jones
Inventor
Jacob F. Becker
By Luther V. Moulton
Attorney

UNITED STATES PATENT OFFICE.

JACOB F. BECKER, OF MUSKEGON, MICHIGAN, ASSIGNOR OF ONE-HALF TO H. CHRIS HANSEN, OF MUSKEGON, MICHIGAN.

ADJUSTABLE LIGHT-SHIELD FOR AUTOMOBILES.

1,106,485.

Specification of Letters Patent.   Patented Aug. 11, 1914.

Application filed April 4, 1913.  Serial No. 758,808.

*To all whom it may concern:*

Be it known that I, JACOB F. BECKER, a citizen of the United States of America, residing at Muskegon, in the county of Muskegon and State of Michigan, have invented certain new and useful Improvements in Adjustable Light-Shields for Automobiles; and I do hereby declare the following to be a full, clear, and exact description of the invention, such as will enable others skilled in the art to which it appertains to make and use the same.

My invention relates to improvements in adjustable light shields for motor boats, automobiles and other vehicles, and its object is to provide a light shield which may be easily and quickly attached to such conveyances, easily adjusted to any desired angle or positions and adapted to be quickly lowered to inoperative position when not in use, and to provide the device with certain other new and useful features hereinafter more fully described and particularly pointed out in the claims.

It has been found desirable while driving motor boats, automobiles, or other vehicles to have some form of shield to protect the driver's eyes against extremely bright light, especially as when meeting motor boats or automobiles at night, which carry bright head lights which tend to flare in the eyes of the driver, and this invention is intended to supply such a light shield in the form of a colored or smoked glass mounted in a frame and attached to the steering post of the vehicle and adapted by various hinge and swivel joints in its supporting means, to be easily and quickly adjusted to the most desirable position or angle, and also adapted to be readily lowered out of operative position when it is not desirable to use it and quickly raised again to operative position when it is needed.

The device is provided with certain other new and useful features of construction and arrangement as will more fully appear by referring to the accompanying drawings, in which:

Figure 1 is a perspective view of a device embodying my invention attached in operative position to the steering post of an automobile; Fig. 2 is an enlarged elevation of one end of the device partially in section; the shield being shown in operative position, the broken lines showing the shield in inoperative position. Fig. 3 is an end elevation of the parts shown in Fig. 2, with portions broken away; Fig. 4 is a section on the line 4—4 of Fig. 3; and, Fig. 5 is a section on the line 5—5 of Fig. 2.

Like numbers refer to like parts in all of the figures.

1 represents an arm provided with a clamping sleeve 2, by which it may be attached to the steering post 3 of an automobile or motor boat. This arm 1 projects from such steering post and has an extension 4 pivotally attached to it at 5, this pivotal connection being in the form of a hinge joint, and provided with a clamping nut 6 by which it may be fixed rigidly in any desired adjustment. The outer end of the extension 4 is forked as at 7, and a lever 8 is pivotally mounted between the said forks, and the upper end of the said lever 8 has attached to it by a hinge joint 9, a vertical arm 10, which carries at its upper end a horizontal arm 11, these two arms being also provided with a hinge connection 12. The outer end of the horizontal arm 11 is provided with a socket 13 to receive the lower end of the frame post 14, which carries the frame 15 and the smoked or colored glass 16 mounted in the frame 15. A set screw 17 in the socket 13 permits the post 14 to be rigidly fixed after being adjusted to the desired position. The lower end of the lever 8 is connected by connecting rods 18 to a spring actuated rod 19 located in an opening in the forward end of the extension arm 4, and a spring 20 normally retracts the rod into the said opening, thus raising the upper end of the lever 8, and a stop pin 21 extending between the forks 7 limits the movement of this lever to a position substantially at right angles to the arm. The lever 8 may be lowered so that it will lie parallel with the extension arm 4, and is adapted to be retained in this lowered position against the tension of the spring 20 by means of a spring actuated latch 22 which engages a detent 23 projecting from the said extension arm 4.

The device may be adjusted in various ways as follows: The arm 1 by means of its clamping sleeve 2 which surrounds the steering post may be adjusted to extend either directly forward from the said steering post or to the right or left thereof at any desired angle. The height of the shield may be adjusted by raising or lowering the outer end of the extension arm 4 which is made possible by the hinge joint 5. The shield is adapted to be adjusted to a true vertical position or to any desired angle therefrom by turning the arm 10 on its hinge connection 9, and the horizontal arm 11 by virtue of its hinge joint 12, may be adjusted to a true horizontal position and the screen may be caused to extend transversely across the car or at any desired angle by rotating the post 14 in the socket 13.

The shield may be easily lowered to inoperative position by the operator when driving the car by simply reaching forward and pulling it downward until the latch 22 engages the detent 23, and may be as easily returned to operative position by releasing the said latch from the said detent, whereupon it will be raised to vertical position by the spring 20 acting through the rod 19 and connecting rods 18 attached to the lower end of the lever 8. The glass 16 is retained in the frame 15 by a removable screw 24 and may be easily removed and replaced by a glass of a different color or density.

What I claim is:

1. An adjustable light shield comprising, an arm adapted to be attached at one end to a vehicle, a lever pivotally connected to the other end of said arm, a light shield carried by said pivoted lever, means for automatically moving the lever and shield to operative position, and a detent to releasably hold the lever and shield in inoperative position.

2. An adjustable light shield comprising, an arm adapted to be adjustably attached at one end to a vehicle, and forked at its other end, a lever pivoted in the said fork and engaging a stop, spring actuated means for holding the lever in one position in engagement with the stop, a latch and detent for holding said lever in a second position, and a light shield mounted on said lever.

3. An adjustable light shield comprising, an arm adapted to be adjustably attached at one end to a vehicle and forked at its other end, a lever pivoted in the said fork, a rod extending into a longitudinal opening in the end of said arm, a spring to normally retract the rod into said opening, connecting rods to connect the outer end of said rod to the lower end of said pivoted lever, a stop to limit the movement of the pivoted lever to a position substantially at right angles to the said arm, a detent on the arm, a spring latch on the pivoted lever to engage the said detent to releasably retain the lever in substantially parallel relation to the arm, and a light shield adjustably mounted on the free end of the pivoted lever.

4. An adjustable light shield for automobiles comprising, an arm adapted to be adjustably attached to the steering post thereof, an extension arm pivotally attached to the outer end of the first arm, a lever pivotally mounted on the outer end of the extension arm and limited in its upward movement by a stop and actuated by a spring to hold it yieldably in engagement with the stop, said lever also being adapted to be turned downward and releasably retained in parallel relation to the said extension arm, a vertical arm pivotally attached to the free end of said pivoted lever, a horizontal arm pivotally attached to the upper end of said vertical arm, and a frame provided with a glass light shield and rotatably attached to said horizontal arm.

5. An adjustable light shield for automobiles comprising, an arm adapted to be adjustably attached to the steering post of such automobile, an extension arm pivotally attached to the outer end of the first arm and forked at its outer end, a lever pivoted in the said fork, a stop to limit the movement of the said lever in one direction to a position at substantially right angles to the extension arm, a spring actuated rod located in a longitudinal opening in the outer end of the extension arm and normally retracted into said opening and connected to the lower end of said pivoted lever to yieldably hold the same against the said stop, a detent on the said extension arm, a spring latch on the pivoted lever adapted to engage the said detent to retain the lever in substantially parallel relation to the extension arm, a vertical arm pivotally attached to the free end of the pivoted lever, a horizontal arm pivotally attached to the upper end of said vertical arm, a frame rotatably mounted on said horizontal arm, and a glass serving as a light shield detachably mounted in said frame.

In testimony whereof I affix my signature in presence of two witnesses.

JACOB F. BECKER.

Witnesses:
 WALLACE FOOT,
 MYRTLE WURTZLER.